United States Patent [19]
Bellamy et al.

[11] Patent Number: 6,022,006
[45] Date of Patent: Feb. 8, 2000

[54] HYDRAULIC ANTIVIBRATION SUPPORT

[75] Inventors: Alain Bellamy, Naveil; Denis Reh, Thiville, both of France

[73] Assignee: Hutchinson, Paris, France

[21] Appl. No.: 09/122,978

[22] Filed: Jul. 27, 1998

[30] Foreign Application Priority Data

Aug. 1, 1997 [FR] France ................................ 97 09878

[51] Int. Cl.$^7$ .................................................. F16F 13/00
[52] U.S. Cl. ............................. 267/140.13; 267/140.12; 267/219
[58] Field of Search .................. 267/140.11, 140.12, 267/140.13, 140.14, 140.15, 219, 220, 292, 293, 294, 140.5, 140.3, 140.4, 140.2; 248/562, 636, 638; 180/300, 312, 902

[56] References Cited

U.S. PATENT DOCUMENTS

| | | | |
|---|---|---|---|
| 4,762,309 | 8/1988 | Hutchins | 267/140.13 |
| 4,765,601 | 8/1988 | Miller et al. | 267/140.13 |
| 5,205,545 | 4/1993 | Quest | 267/140.13 |
| 5,556,071 | 9/1996 | Bellamy et al. | 248/634 |
| 5,741,001 | 4/1998 | Bellamy et al. | 248/634 |

FOREIGN PATENT DOCUMENTS

| | | |
|---|---|---|
| 0 389 839 B1 | 10/1990 | European Pat. Off. . |
| 0 646 735 A1 | 4/1995 | European Pat. Off. . |
| 0 709 594 A1 | 5/1996 | European Pat. Off. . |
| 39 09 852 A1 | 3/1990 | Germany . |
| 06231269 | 8/1994 | Japan . |

OTHER PUBLICATIONS

French Preliminary Search Report dated May 13, 1998, French Application FR 9709878.

*Primary Examiner*—Douglas C. Butler
*Attorney, Agent, or Firm*—Marshall, O'Toole, Gerstein, Murray & Borun

[57] ABSTRACT

A hydraulic antivibration support comprises a strength member connected to a plate by an elastomer body whose base is pressed against the plate to define two hydraulic chambers and a narrow channel, all filled with liquid. A perforated insert is embedded in the base of the elastomer body and is crimped to the plate via two fixing edges that are interconnected by two free edges of the base. A rigid cover covers the elastomer body and has flanges which are fixed directly against the plate, the flanges extending towards the elastomer body in the form of bearing zones which press against the free edges of the base of the elastomer body.

7 Claims, 2 Drawing Sheets

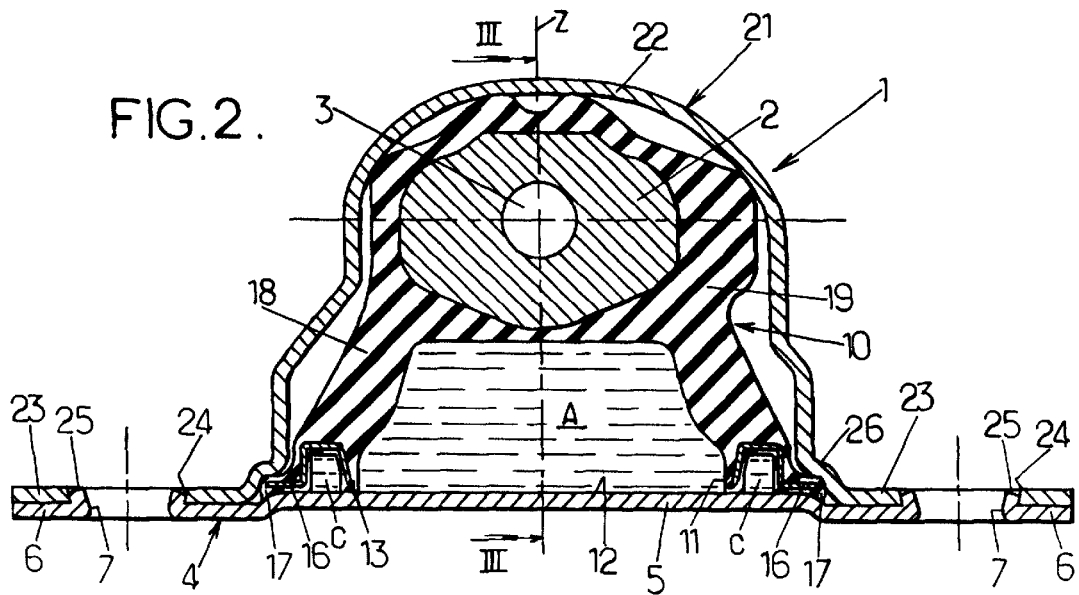
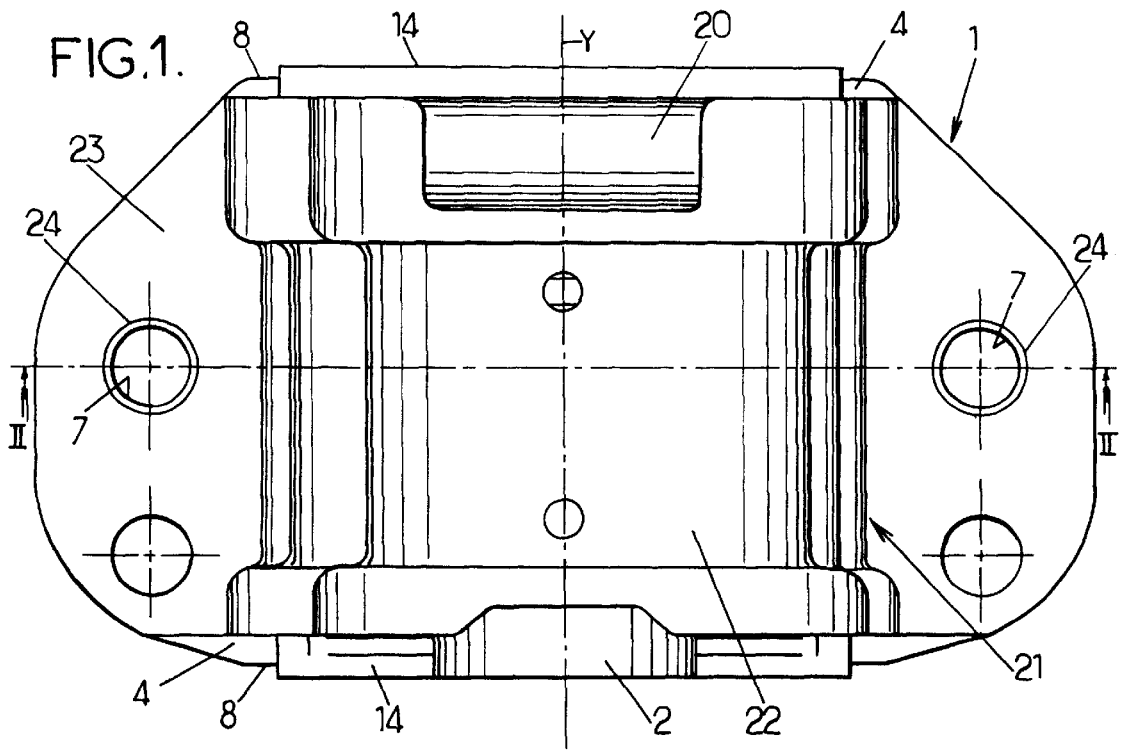

HYDRAULIC ANTIVIBRATION SUPPORT

FIELD OF THE INVENTION

The present invention relates to hydraulic anti-vibration supports.

More particularly, the invention relates to a hydraulic antivibration support designed to be interposed between two rigid elements to damp vibration between said two elements essentially along a first axis, said support comprising:

first and second rigid strength members suitable respectively for being secured to the two rigid elements that are to be united, the second strength member being constituted by a plate which extends perpendicularly to the first axis and which has a "support" face facing towards the first strength member;

an elastomer body connecting the first strength member to the plate and having a base pressed in sealing contact against the support face of the plate merely by clamping parallel to the first axis, said axial clamping being obtained by means of a rigid perforated insert which is embedded in the base of the elastomer body and which is secured to the plate by crimping, the base of the elastomer body having at its periphery firstly at least two opposite "fixing" edges along which said crimping is performed, and secondly at least two free edges interconnecting the fixing edges, the perforated insert itself having free edges which are embedded in the free edges of the base of the elastomer body and which are merely pressed axially against the support face of the plate, the elastomer body further including a bell-shaped thick wall extending along the first axis, flaring from a top secured to the first strength member to the base of said elastomer body, and co-operating with the support face of the plate to define at least a first hydraulic chamber filled with liquid;

a deformable second hydraulic chamber which is likewise filled with liquid;

a narrow channel filled with liquid and inter-connecting the first and second hydraulic chambers; and a rigid cover covering the thick wall of the elastomer body at least in part so as to limit displacement of the first strength member relative to the plate, said cover having fixing zones extending parallel to the plate and secured to said plate in the vicinity of the free edges of the base of the elastomer body, said free edges of the perforated insert and of the base of the elastomer body being clamped axially between the support face of the plate and said cover.

BACKGROUND OF THE INVENTION

Document EP-A-0 646 735 describes an example of a hydraulic antivibration support of the above-specified type, in which the free edges of the base of the elastomer body are formed by two tabs of the perforated insert which are covered in elastomer and which are interposed between the zones where the cover is fixed to the plate.

As a result, when such antivibration supports are in use, the elastomer layers covering said tabs of the perforated insert can creep under the effect of repeated forces applied by the cover, and that can lead to leaks.

OBJECTS AND SUMMARY OF THE INVENTION

A particular object of the present invention is to mitigate that drawback.

To this end, according to the invention, in a hydraulic antivibration support of the kind in question the fixing zones of the cover are disposed radially outside the free edges of the perforated insert and the base of the elastomer body, said fixing zones being in direct contact with the support face of the plate, and said fixing zones extending towards the elastomer body via bearing zones which are pressed parallel to the first axis against the free edges of the perforated insert and of the base of the elastomer body, thereby pressing said free edges against the plate.

By means of these dispositions, the dynamic forces to which the cover is subjected are taken up directly by the zone of direct contact between said cover and the plate, without compressing the free edges of the base of the elastomer body: this eliminates the above-mentioned creep effects, thereby guaranteeing long-lasting sealing for the antivibration support.

In addition, the static clamping force applied to the free edges of the base of the elastomer body is entirely defined by the shapes of the parts constituting the antivibration support, such that this force is completely under control. This avoids leaks that could otherwise be caused either by said free edges being clamped together too loosely or by said free edges being damaged by being clamped together too tightly.

Finally, the invention also makes it possible to reduce the contact area between the cover and the free edges of the base of the elastomer body, thereby making it possible to obtain sufficiently high contact pressure locally along said free edges without having to exert an excessive clamping force between the cover and the plate: assembling the antivibration support of the invention is thus made easier.

In preferred embodiments of the invention, use may optionally be made of one or more of the following dispositions:

the fixing zones of the cover are secured to the plate by crimping;

the fixing zones of the cover and of the plate are pierced by fixing holes disposed in register with one another to enable the plate and the cover to be fixed to one of the two rigid elements to be united;

the perforated insert has tabs which are crimped to the rim of the plate at the fixing edges of the base of the elastomer body;

the base of the elastomer body has two fixing edges interconnected by two free edges;

the cover is generally Ω-shaped and open along a second axis perpendicular to said first axis, with two fixing flanges forming said fixing zones, and the first strength member is in the form of an elongate rigid member extending longitudinally along said axis; and the elastomer body further includes a freely-deformable thin wall which co-operates with the support face of the plate to define the second hydraulic chamber, the narrow channel itself being defined between the base of the elastomer body and said support face of the plate.

BRIEF DESCRIPTION OF THE DRAWINGS

Other characteristics and advantages of the invention appear from the following description of an embodiment, given by way of non-limiting example and with reference to the accompanying drawings. In the drawings:

FIG. 1 is a plan view of a hydraulic anti-vibration support constituting an embodiment of the invention;

FIG. 2 is a section view on line II—II of FIG. 1;

MORE DETAILED DESCRIPTION

In the various figures, the same references designate elements that are identical or similar.

Figure 3:
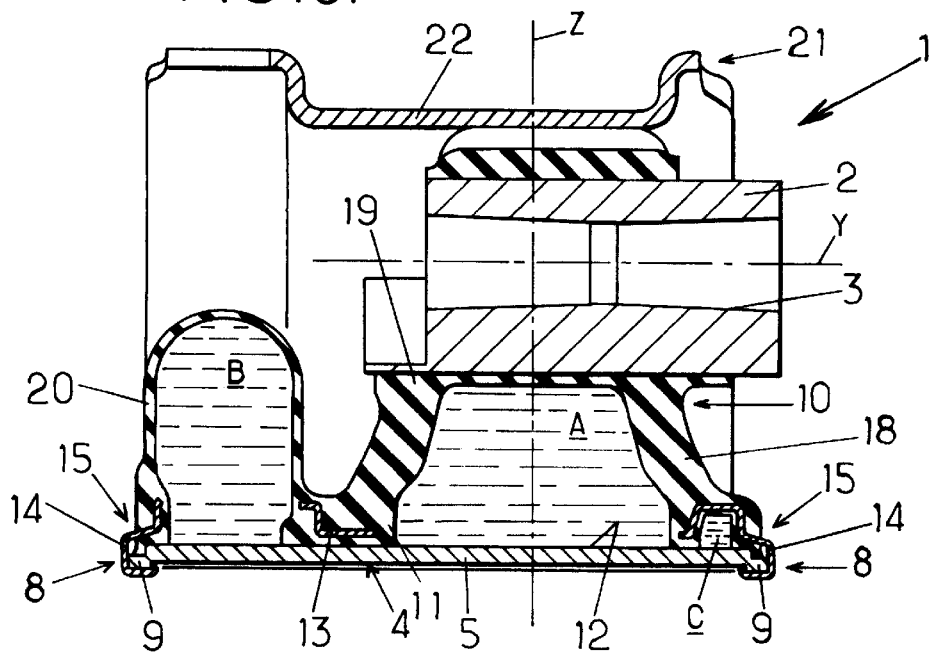
FIG. 3 is a section view on line III—III of FIG. 2.

The hydraulic antivibration support 1 shown in FIGS. 1 to 3 is designed to be interposed between two rigid elements such as the structure and the power unit of a vehicle, for the purpose of supporting the power unit and of damping and filtering vibration between those two elements, essentially along a vertical axis Z.

The antivibration support comprises firstly a first rigid strength member 2 in the form of an elongate metal member extending along an axis Y perpendicular to the axis Z and pierced by a central hole 3 enabling it to be fixed to the power unit of the vehicle, for example.

This first strength member 2 is disposed above a second rigid strength member 4 in the form of a metal plate that is substantially plane in general shape, extending perpendicularly to the axis Z, i.e. horizontally.

The plate 4 has a stamped central portion 5 that is plane in shape, and that is slightly raised relative to two fixing flanges 6 at opposite ends of said central portion.

Each of the flanges 6 is provided with at least one fixing hole 7 designed to fix the plate 4 to the structure of the vehicle.

Naturally, the plate 4 could be fixed to the power unit and the strength member 2 to the structure, in which case the strength member 2 would be situated beneath the plate 4, and the overall disposition of the antivibration support would then be upside-down relative to the disposition shown in the drawings.

In addition, the plate 4 has two lateral edges 8 each extending between the two fixing flanges 6 and forming respective rims or margins 9 that are offset downwards relative to the central portion 5.

Also, the plate 4 is connected to the strength member 2 by an elastomer body 10 which is molded as a single piece and which has a base 11 pressed in sealed manner against the support or top face 12 of the plate 4, merely by axial clamping parallel to the axis Z.

This axial clamping is obtained by crimping a perforated and stamped rigid metal insert 13 which is generally made of steel and which is embedded in the base 11 of the elastomer body.

More particularly, the perforated insert 13 has two side tabs 14 which project outwards from two opposite edges 15 of the base of the elastomer body, which extend along the length of the rims 9, and which are crimped to said rims 9.

In addition, the tabs 14 of the perforated insert 13 are connected to each other by two opposite edges 16 of said insert, which edges together with the tabs 14 form the periphery of the perforated insert, with each edge constituting a plane margin parallel to the plane of the plate 4.

These two free edges 16 are embedded in the base 11 of the elastomer body, thereby likewise forming two free edges 17 corresponding to the edges 16, said free edges 16, 17 being merely pressed axially against the top face 12 of the plate, without crimping.

The elastomer body 10 also has a bell-shaped thick wall 18 having sufficient compression strength to support the power unit. This wall 18 flares downwards from a top 19 bonded to the strength member 2 to the base 11 of the elastomer body, co-operating with the top face 12 of the plate to define a working chamber A which is filled with liquid.

In addition, the elastomer body 10 also forms a flexible membrane 20 that is likewise bell-shaped, that is freely deformable, and that co-operates with the top face 12 of the plate to define a compensation chamber B which is also filled with liquid.

The two chambers A and B are thus juxtaposed in non-concentric manner on the top face 12 of the plate, and these two chambers may, for example, be substantially in alignment on the axis Y.

Furthermore, the two chambers A and B communicate with each other via a narrow channel C which is defined between the top face 12 of the plate and a groove formed in the base 11 of the elastomer body, the shape of the groove being preferably defined by stamping the perforated insert 13.

The narrow channel C thus enables liquid to be transferred between the chambers A and B for the purpose of damping vibration between the strength member 2 and the plate 4, essentially along the axis Z.

Finally, to limit displacement of the strength member 2 relative to the plate 4, the antivibration support also includes a rigid metal cover 21 which is a section member of substantially Ω-shaped section having two open axial faces extending perpendicularly to the axis Y.

The cover 21 has a central portion 22 capable of co-operating with projections on the elastomer body by coming into abutment therewith, and it extends between two horizontal flanges 23 which rest on the fixing flanges 6 of the plate.

These flanges 23 have respective fixing holes 24 in register with the fixing holes 7 of the flanges 6 so that the plate 4 and the cover 21 can be fixed together by being screwed to the structure of the vehicle.

In addition, the flanges 23 and 6 are advantageously also fixed to each other by crimping.

By way of example, the crimping can be performed by flaring portions 25 of the plate 4 through the holes 24 in the flanges of the cover, in which case the holes are frustoconically shaped, flaring upwards.

Figure 4:
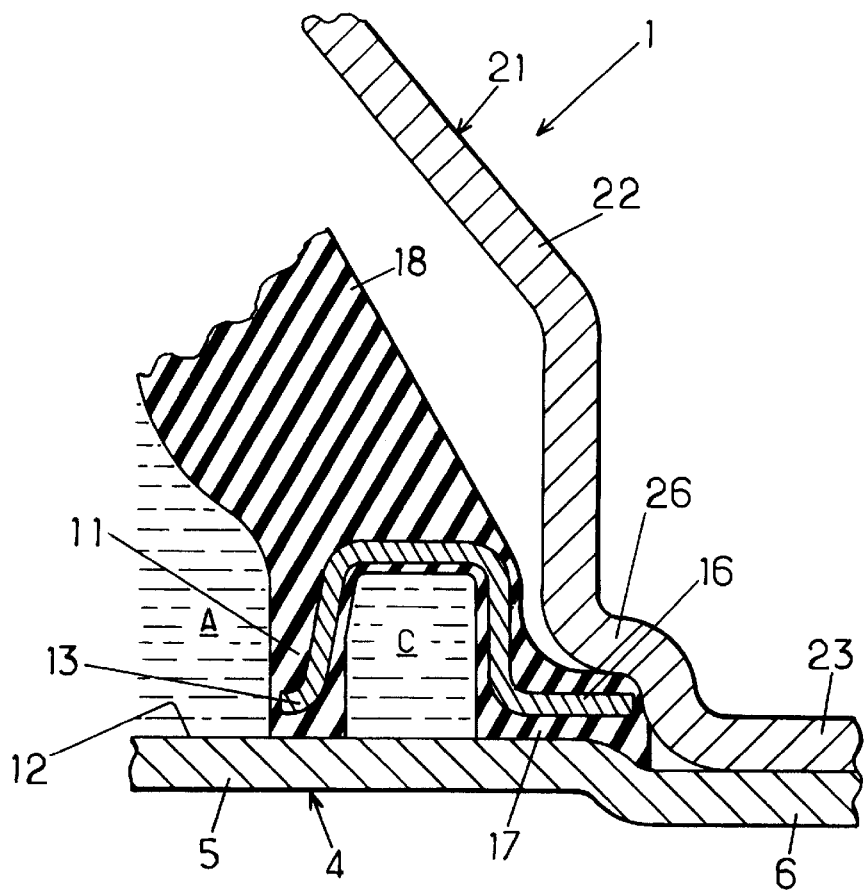
FIG. 4 is a detail view of FIG. 2.

Finally, as can be seen in greater detail in FIG. 4, the cover also includes a step 26 between its central portion 22 and each of its flanges 23, which step forms a bearing zone which presses parallel to the axis Z against the free edges 16 and 17 of the perforated insert and the base of the elastomer body, thereby pressing these free edges against the top face 12 of the plate.

This guarantees that the free edges 16, 17 are pressed with determined force against the plate 4, thereby avoiding any leakage of liquid between said plate and the base of the elastomer body via said free edges 16, 17.

We claim:

1. A hydraulic antivibration support designed to be interposed between two rigid elements to damp vibration between said two elements essentially along a first axis, said support comprising:

first and second rigid strength members suitable respectively for being secured to the two rigid elements that are to be united, the second strength member being constituted by a plate which extends perpendicularly to the first axis and which has a support face facing towards the first strength member, said plate including a stamped central portion extended by two lateral opposite fixing flanges, said central portion protruding on the support face relative to the fixing flanges, so that said central portion is separated from said fixing flanges by two raised steps;

an elastomer body connecting the first strength member to the plate and having a base pressed in sealing contact against the support face of the plate merely by clamping parallel to the first axis, said axial clamping being obtained by means of a rigid perforated insert which is embedded in the base of the elastomer body and which is secured to the plate by crimping, the base of the elastomer body having at its periphery firstly two opposite fixing edges along which said crimping is performed, and secondly two free edges interconnecting the fixing edges and disposed substantially along said two steps of the plate, the perforated insert itself having free edges which are embedded in the free edges of the base of the elastomer body and which are merely pressed axially against the support face of the plate, the elastomer body further including a bell-shaped thick wall extending along the first axis, flaring from a top secured to the first strength member to the base of said elastomer body, and co-operating with the support face of the plate to define at least a first hydraulic chamber filled with liquid;

a deformable second hydraulic chamber which is likewise filled with liquid;

a narrow channel filled with liquid and interconnecting the first and second hydraulic chambers; and a rigid cover covering the thick wall of the elastomer body at least in part so as to limit displacement of the first strength member relative to the plate, said cover having fixing zones extending parallel to the plate and secured to said plate in the vicinity of the free edges of the base of the elastomer body, said free edges of the perforated insert and of the base of the elastomer body being clamped axially between the support face of the plate and said cover;

wherein the fixing zones of the cover are disposed radially outside the free edges of the perforated insert and the base of the elastomer body, said fixing zones being in direct contact with the support face of the plate, and each of said fixing zones extending towards the elastomer body via a step forming a raising portion and a bearing zone which is pressed parallel to the first axis against the free edges of the perforated insert and of the base of the elastomer body, thereby pressing said free edge against the plate;

and wherein the raising portion of the steps of the cover are pressing the free edges of the base of the elastomer body substantially perpendicular to the first axis towards the first hydraulic chamber, thereby also pressing the free edges of the base of the elastomer body substantially perpendicular to the first axis against the raised steps of the plate.

2. A hydraulic antivibration support according to claim 1, in which the fixing zones of the cover are secured to the plate by crimping.

3. A hydraulic antivibration support according to claim 1, in which the fixing zones of the cover and of the plate are pierced by fixing holes disposed in register with one another to enable the plate and the cover to be fixed to one of the two rigid elements to be united.

4. A hydraulic antivibration support according to claim 1, in which the perforated insert has tabs which are crimped to the rim of the plate at the fixing edges of the base of the elastomer body.

5. A hydraulic antivibration support according to claim 4, in which the base of the elastomer body has two fixing edges interconnected by two free edges.

6. A hydraulic antivibration support according to claim 5, in which the cover is generally Ω-shaped and open along a second axis perpendicular to said first axis, with two fixing flanges forming said fixing zones, and the first strength member is in the form of an elongate rigid member extending longitudinally along said axis.

7. A hydraulic antivibration support according to claim 1, in which the elastomer body further includes a freely-deformable thin wall which co-operates with the support face of the plate to define the second hydraulic chamber, the narrow channel itself being defined between the base of the elastomer body and said support face of the plate.

* * * * *